FIG. 1

Aug. 5, 1969   D. A. SOKOLOV   3,459,888
SELECTIVE PHOTOCOPIER

Filed Jan. 2, 1968   7 Sheets-Sheet 2

INVENTOR.
DAVID A. SOKOLOV
BY
ATTORNEYS

United States Patent Office 3,459,888
Patented Aug. 5, 1969

3,459,888
SELECTIVE PHOTOCOPIER
David A. Sokolov, Fairport, N.Y., assignor to Xerox Corporation, Rochester, N.Y., a corporation of New York
Continuation-in-part of application Ser. No. 532,289, Mar. 7, 1966. This application Jan. 2, 1968, Ser. No. 700,317
Int. Cl. H04n 3/16
U.S. Cl. 178—7.7                                                                10 Claims

ABSTRACT OF THE DISCLOSURE

Apparatus for selectively masking graphic material to be recorded on photographic film wherein masking is performed by using a cathode ray tube (CRT) to generate and position a light pattern over an area of the graphic material to be masked thereby overexposing the film in the area of the light pattern when the graphic material is imaged onto the film and wherein a light pattern is formed by selectively blanking the CRT electron beam in one embodiment by a circuit operating on the CRT horizontal and vertical deflection signals and in another embodiment by a circuit operating on the CRT horizontal and vertical synchronization pulses.

Related applications

This application is a continuation-in-part of a copending application by the same inventor tilted "Recording Apparatus," filed Mar. 7, 1966, Serial No. 532,289, now abandoned.

Background of the invention

This invention relates to graphic recording and more particularly to method and apparatus for rapidly copying document information selectively onto a recording medium such as microfilm.

The widely accepted use of microfilm as a means for storing information has not only increased the use of microfilm but has also increased the need for various techniques of exposing the film. As can readily be appreciated, the process by which documents are photographically exposed onto microfilm is tedious and time consuming. Thus, where it is desired to expose less than all of the document as, for example, to select a certain portion of the document to be reproduced, the opto-mechanical adjustments necessary for masking the document further complicates the procedure followed.

There is at present a great demand for the partial or limited exposure of a document area, e.g. the translation of document information into foreign languages. It is usual for this purpose to place the document information onto microfilm from which this information can be fed into computers that perform the function of translating the alphanumeric information of the document into the language desired. In translating the documents it is often necessary to change the format of the page and eliminate such things as headings, graphic illustrations, and the like. To accomplish this, the alphanumeric information or text of the document must be separated from the remaining graphic information onto the recording medium from which the alphanumeric information can be supplied to a computer. The alphanumeric information translated by the computer is placed onto a similar recording medium and recombined with the graphic information from which it was separated to produce a suitable foreign translation of the original document. When it is considered how many exposures must be made in separating the alphanumeric and graphic information as, for example, in an engineering journal having several hundred pages with many graphs and illustrations, the desirability of a selective photocopier capable of discriminately distinguishing certain types of information at high printing rates becomes increasingly apparent.

Summary of the invention

Now in accordance with the present invention, there is provided method and apparatus for copying documents which enables rapid discrimination of that portion of the document to be reproduced. Generally speaking, the scanning spot from a cathode ray tube, hereinafter referred to as a CRT, is selectively blanked to form a superposed light mask over the document during exposure to the recording medium. The exposure of the sensitized recording material is differently controlled so that only the information desired to be reproduced is exposed to make a recording while the masked information is overexposed, i.e., is subject to an exposure generally exceeding the sensitivity of the recording medium and hence is blanked out in the final reproduction.

It is, therefore an object of this invention to provide novel apparatus for the selective copying of document information.

It is also an object of this invention to provide a novel masking system to be used in conjunction with copying document information onto light sensitive film or the like.

It is a further object of this invention to provide improved photocopy apparatus for rapidly producing high resolution microfilm prints of document information.

It is another object of this invention to provide a novel source of selective illumination.

It is a further object of this invention to provide novel selective blanking control circuit for a flying spot scanner cathode ray tube.

Description of the drawings

For a better understanding of the invention as well as other objects and features thereof, reference is made to the following description to be read in connection with the accompanying drawings wherein.

Description of the invention

Figure 1:
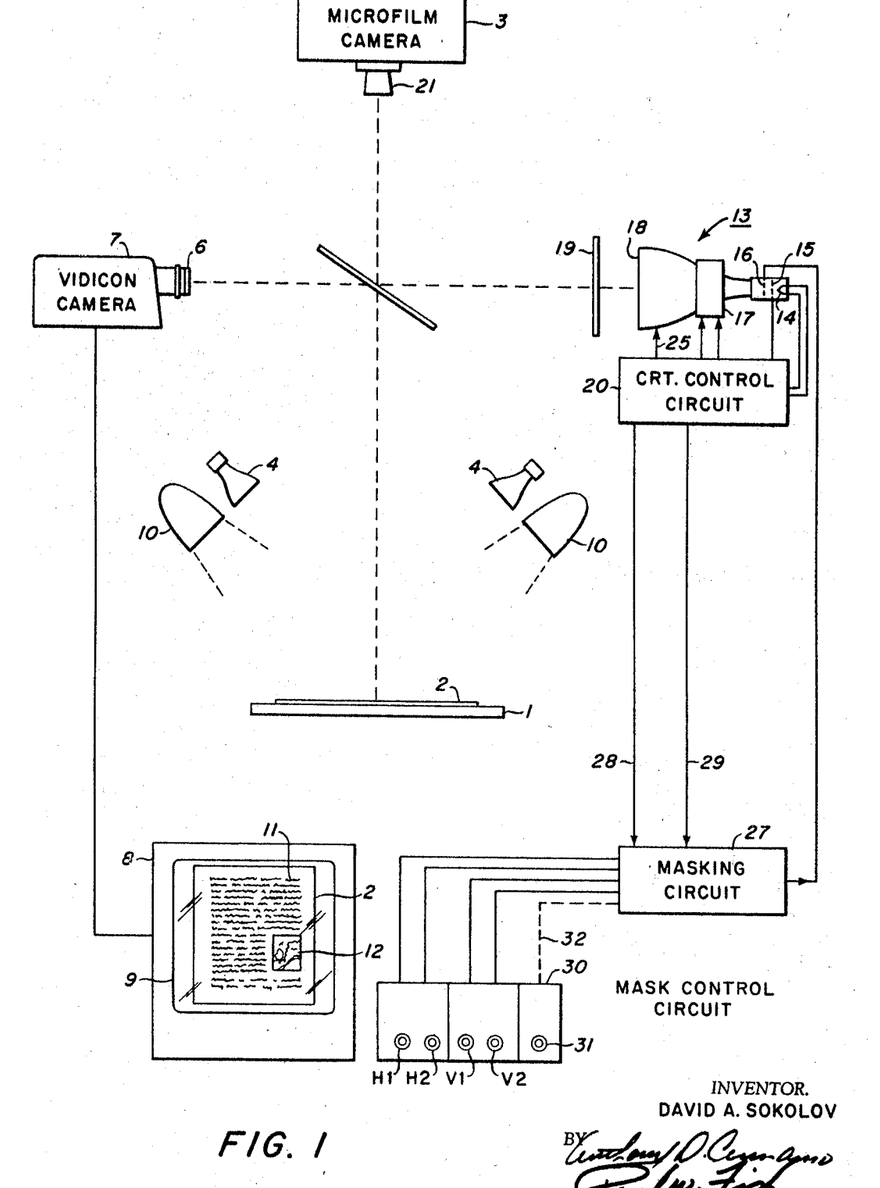
FIGURE 1 is a schematic representation of the masking apparatus according to the present invention.

Referring to the system illustrated in FIGURE 1, there is a support member 1 for supporting a document, for example, document 2, in a recording position relative to a recorder 3, which for purposes of illustration is shown as a conventional microfilm camera. Conventional flash lamps 4 are positioned relative to document 2 to illuminate this document for purposes of exposure of the sensitive recording material in the camera 3. It is understood that the period of exposure and the intensity of the flash lamps are such as to prevent the recording sensitivity of the recording medium from being exceeded during exposure. As is seen in this figure, a beam splitter 5 is positioned intermediate the camera 3 and the support member 1, thereby permitting the image of the document 2 to be refracted therethrough and focused onto the sensitive recording material, for example, light sensitive film, in camera 3 by lens 21. As is well known in the art, the beam splitter 5 will also reflect the document image onto a lens 6 of a conventional Vidicon camera 7 which constitutes the input to a conventional closed circuit television arrangement which has a conventional output receiver 8. The screen 9 of the receiver 8 displays the document image picked up by the Vidicon camera 7 reflected by the beam splitter 5. This displayed image is viewed by an operator who can then make the decision as to what portions of the document 2 should be masked before exposure to the sensitive recording material in the camera 3. Conventional incandescent lamps 10 are positioned relative to the support member 1 to illuminate the document 2 in order that the Vidicon camera 7 may discern the alphanumeric-graphic format on the illuminated side of the document 2. For purposes of explanation, the document 2 is illustrated to show alphanumeric information, generally designated by reference numeral 11, and graphic information, generally designated by reference numeral 12. As the operator views the facsimile of the document 2 on the screen 8, he may decide that it is desirable to mask the graphic portion 12. By the term "mask" it is understood that the image of a portion to be masked has superimposed thereover a coextensive pattern of illumination of substantially uniform intensity such that that area of the sensitive recording material on which this masked portion is normally focused will be overexposed, i.e., the recording sensitivity of the recording material is exceeded at this area, thereby making it impossible to record the information contained in that area of the document which is masked.

One manner of obtaining the selective masking of desired areas of the document 2 is through the use of a flying spot scanner system which will now be described. Cathode ray tube (CRT), designated generally by reference numeral 13, is of conventional design having a cathode 14, two control electrodes 15 and 16, a deflection field generator 17, and other conventional electrodes not illustrated for the purposes of simplicity which form the electrons from the cathode 14 into a pencil beam to be deflected in raster configuration on a fluorescent screen 18. The light emitted upon impact by the electron beam on the fluorescent screen 18 is focused by a lens 19 onto the beam splitter 5. This light is reflected by the beam splitter 5 onto a lens 21 of the camera 3 and consequently on the sensitive recording material in this camera as well as refracted through the beam splitter 5 onto the lens 6 of the Vidicon camera 7. In this manner the operator viewing the screen 9 of the receiver 8 can observe the light pattern generated by CRT 13 and the reflected image of the document 2 as a composite image. Cathode ray tube 13 has a conventional control circuit, generally designated 20, which provides suitable bias potential to the cathode 14 as well as suitable deflection and retrace blanking waveforms to the deflection field generator 17, for example, a deflection yoke, and the control electrode 15, respectively, in addition to suitable high voltage via conductor 25. Control electrode 16 receives a series masking signals over a conductor 26 from a masking circuit 27 which will be described in more detail hereinafter. Masking circuit 27 receives two inputs from the conventional CRT control circuit 20 in the form of vertical and horizontal deflection ramp waveforms via conductors 28 and 29, respectively. Masking circuit 27 also receives four position signal inputs from a mask control circuit 30 which is under the control of the operator by way of, for example, four manually controlled knobs H1, H2, V1 and V2, which will be explained in more detail hereinafter. The operator also has available to him a mask-reversal switch 31 which has a symbolic connection 32 to masking circuit 27. The function of this switch will be explained hereinafter.

The general operation then of the system illustrated in FIGURE 1 is as follows:

A document 2, the image of which is to be recorded, is placed on the support member 1 and suitably illuminated by the lamps 10. The image of the document is conveyed via the beam splitter 5 to the Vidicon camera 7 and to the receiver 8 where it is viewable on the screen 9 by an operator. After the decision is made as to what portion of the document is to be masked, the operator manipulates the knobs H1, H2, V1, and V2 of the mask control circuit 30 to superimpose over the image of the document 2 focused on the lens 21 of the camera 3, a rectangle, for example, of light to overexpose that area of the recording material on which the desired masked portion of the document is focused. After the desired masking has been accomplished by light from CRT 13, the flash lamps 4 and the shutter of the camera 3 are energized synchronously to effect the recording of the unmasked portions of the document 2 onto the recording material in the camera 3.

Figure 2:
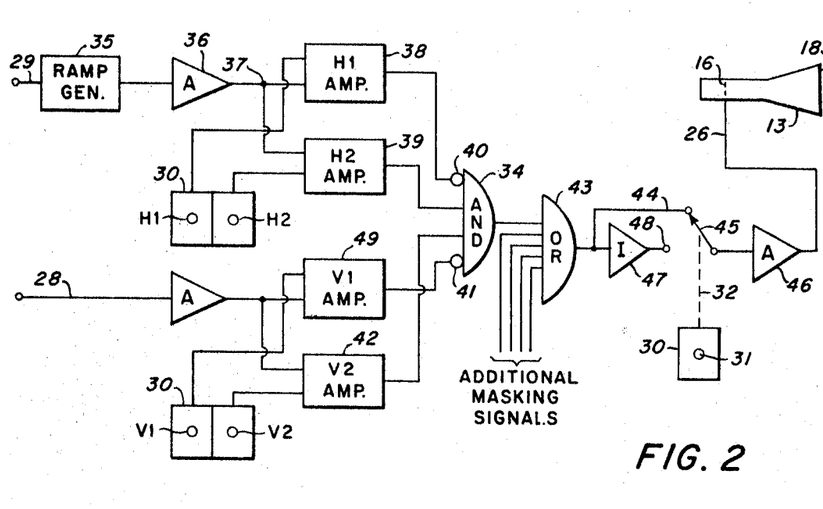
FIGURE 2 is a block diagram of the control circuit for the cathode ray tube in accordance with the present invention.

Reference is now made to FIGURE 2 which illustrates a block diagram of the mask control circuit 30 and the masking circuit 27. A logic gate 34, having an AND gate function, is shown as having four inputs, one pair of inputs coming from what will be referred to as the horizontal channel and a second pair of inputs from what will be referred to as the vertical channel. It is understood that the circuit arrangements represented by the various blocks are identical for both channels but for one exception.

This one exception is the presence of a ramp generator 35 at the input to the horizontal channel. This ramp generator is optional, depending upon the effects of noise on the horizontal deflection ramp signal derived from the conventional CRT control circuit 20, as shown in FIGURE 1. If noise distorts the waveforms too severely from CRT control circuit 20, it may be desirable to generate a corresponding ramp signal by means of the optional ramp generator 35.

Input conductor 29 to the horizontal channel corresponds with the identically numbered conductor in FIGURE 1 and supplies a horizontal time base waveform to a conventional buffer amplifier 36 which is used for impedance matching purposes as is known in the art. The output from the buffer amplifier 36 is supplied to a terminal 37 which is connected to inputs of an H1 amplifier 38 and a H2 amplifier 39 which have outputs forming a pair of inputs to AND gate 34. It will be recognized that the circular symbol 40 at the H1 amplifier output represents a conventional inverter. An identical inverter 41 is included at the output of a V2 amplifier 42 in the vertical channel. Mask control circuit 30, referred to in the description of FIGURE 1, is shown in FIGURE 2 as three separate blocks designated by the same reference numeral as used in FIGURE 1. The horizontal channel mask control circuit 30 is seen to include the circuits actuated by the knobs H1 and H2, while the vertical channel mask control circuit 30 includes the circuit controlled by the knobs V1 and V2. The output of AND gate 34 forms one input to an OR gate 43.

The additional inputs to the OR gate 43 may represent additional masking signals where it is desirable, for example, to mask more than one graphic area of a document for one exposure. Such additional masking signals would have respective horizontal and vertical masking circuit channels similar to those shown in FIGURE 4.

The output of the OR gate 43 is supplied by a conductor 44 through a movable arm 45 to a conventional limiting amplifier 46, the output of which is connected directly to the control electrode 16 of CRT 13. It is understood that the output of the limiting amplifier 46, in the absence of a masking signal at its input, is of such magnitude and polarity as to blank the electron beam in CRT 13. Inverter 47, shown bypassed by the conductor 44 and the movable arm 45, may be inserted into the circuit by bringing the movable arm 45 into contact with an output terminal 48 of the inverter 47. Movable arm 45 is shown symbolically connected to the mask reversal switch 31 of the mask control circuit 30 by a dashed line 32 which is available to the operator as desired.

The purposes of including the inverted 47 in the circuit between the output of the OR gate 43 and the input of the limiting amplifier 46 is to effect a reversal in the polarity of the masking signal applied to the control electrode 16 of CRT 13 and thereby "unblank" the beam from the cathode 14. This reversal may be effected when it is desirable, after having recorded the alphanumeric portion of a document, to then record on a successive area of the recording medium in the camera 3 the graphic information on the document which was masked during the previous exposure. In this manner, by placing the movable arm 45 to the output terminal 48 of the inverter 47, the previously masked portions of the document will now be illuminated by the flash lamps 4 and therefore recordable by the camera 3 while the previously unmasked portions will be selectively overexposed by the flying spot scanner system to make recording of the information of these areas impossible by the camera 3.

With the overall block diagram of the mask control circuit 30 and the masking circuit 27 having been explained, a detailed discussion of the actual circuits employed in this block diagram will be given.

Figure 3:
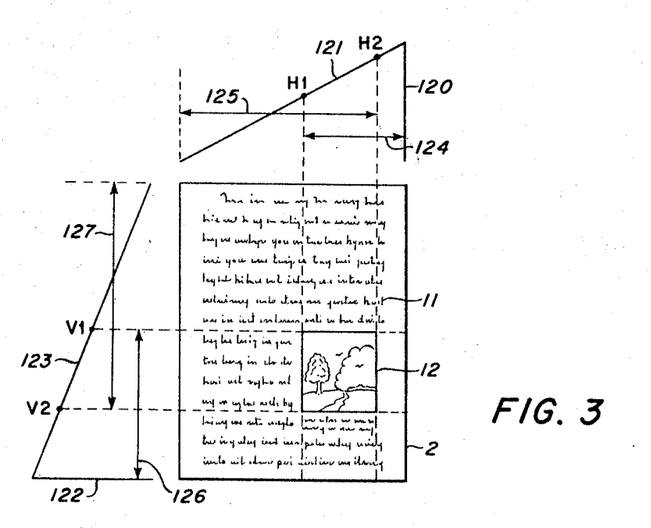
FIGURE 3 is an illustration showing the relationship of the deflection waveforms for the cathode ray tube and the document to be selectively illuminated.
Figure 4:
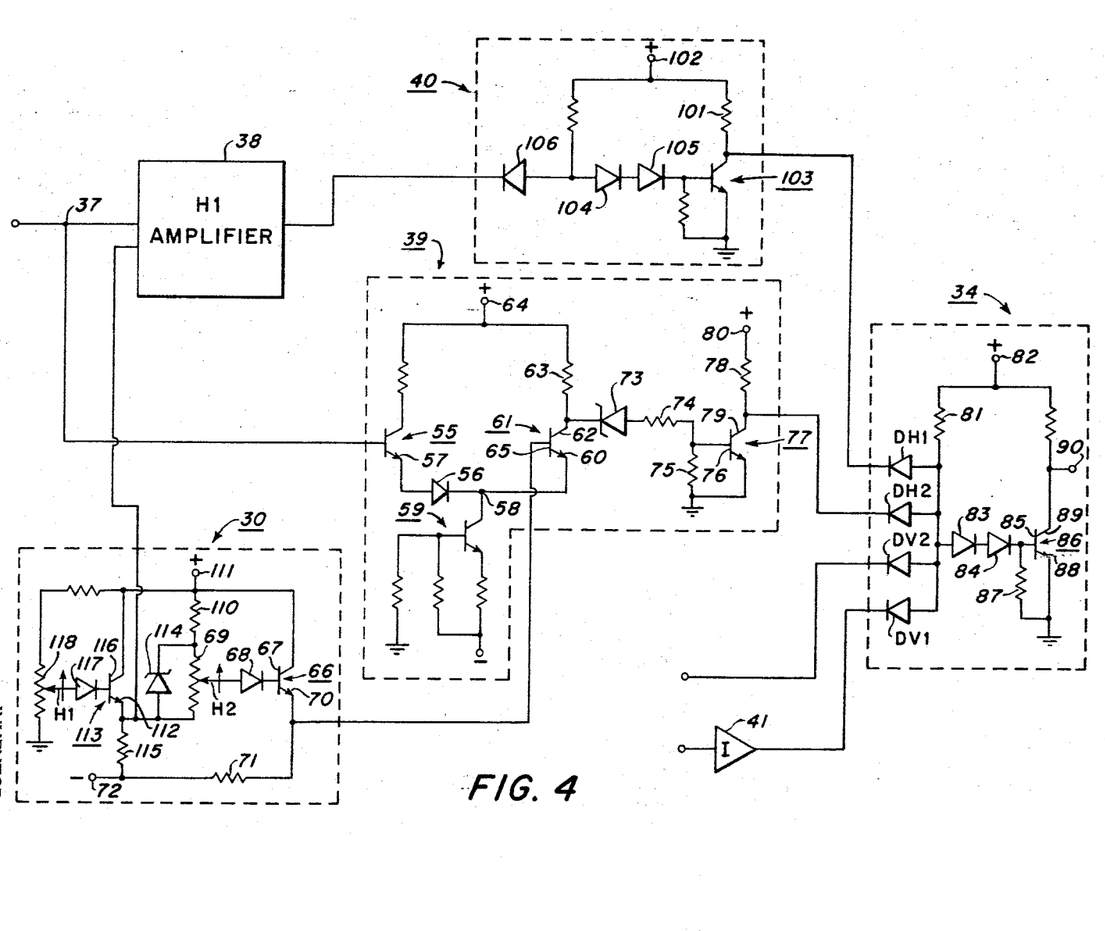
FIGURE 4 is a schematic diagram of a portion of the control circuit of FIGURE 2 in accordance with this invention.

Reference is now made to the illustration of FIGURE 3 and its relation to the operation of the circuit of FIGURE 4. The identity in the circuits in the horizontal channel and the vertical channel make it necessary only to discuss in detail one channel; namely, the horizontal channel. It will be noted that similar referenced numerals appearing in FIGURES 2 and 4 designate similar elements.

In FIGURE 4, at the terminal 37 there is present a horizontal deflection ramp waveform supplied thereto from the CRT control circuit 20, as referred to in FIGURE 1. This deflection waveform is supplied as an input to the H1 amplifier 38, shown for simplicity in block form, and also as an input to the H2 amplifier 39, the circuit of which is shown in detail. Referring then to the detailed circuit of the H2 amplifier 39, it will be seen that the input ramp waveform is supplied to the base electrode 54 of a normally non-conducting input transistor 55. The positive going ramp waveform initiates conduction of the input transistor 55 thereby forward biasing a diode 56, the anode of which is directly connected to the emitter electrode 57 of the input transistor 55, while the cathode of the diode 56 is directly connected to the terminal 58.

Connected also to the terminal 58 is a constant current source generally designated by reference numeral 59. Terminal 58 is also connected to the emitter electrode 60 of a transistor 61 which has a collector electrode 62 connected through a bias resistor 63 to a source of suitable positive potential applied at a terminal 64. Base electrode 65 of the transistor 61 is connected to the H2 section of the mask control circuit 30. This H2 section comprises a normally conductive transistor 66, the base electrode 67 of which is connected through a diode 68 to a movable tap on a potentiometer 69. Emitter electrode 70 of the transistor 66 is connected through resistor 71 to a source of suitable negative potential applied at terminal 72. The movable tap is designated H2 and can be controlled by movement of the knob H2 as shown in FIGURE 1. In this manner, a suitable potential is selected by the movable arm H2 from potentiometer 69 to control the degree of conduction of the transistor 66 thereby producing at the emitter electrode 70 an output signal proportional to the selected potential on the potentiometer 69. This output signal is directly connected to the base electrode 65 of the transistor 61 and, by design, this signal is of such a value as to render this transistor 61 conductive in view of the potential at the terminal 58 effected by the constant current source 59. The current through conducting transistor 61 produces a voltage drop across the resistor 63 which back biases a Zener diode 73 thereby maintaining a transistor 77 non-conducting. In this state of non-conduction, the collector electrode 79 of the transistor 77 is at the positive potential applied from a suitable potential source connected to a terminal 80 through a resistor 78. This positive potential is of a sufficient magnitude to render an input diode DH2 of the AND gate 34 non-conductive.

Diode DH2 along with other input diodes DH1, DV1, and DV2, make up the inputs to AND gate 34. These input diodes have their cathodes connected to the output of their respective H or V amplifiers either directly or through an inverter stage. The anodes of these diodes are connected in common to one side of a resistor 81, the other side of which is connected to a suitable source of positive potential applied at a terminal 82. The common connection of the anodes is also connected through two diodes 83 and 84 to the base electrode 85 of a transistor 86. Resistor 87 has one end connected to the base electrode 85 and its other end connected to ground. Emitter electrode 88 of the transistor 86 is connected directly to ground. Diodes 83 and 84 are connected in series such that the cathode of the diode 84 is connected to the base electrode 85 of the transistor 86 while the anode of the other series diode 83 is connected to the common junction of the four input diodes. The output of the AND gate 34 is taken off the collector electrode 89 of the transistor 86.

When the AND gate 34 is enabled, the transistor 86 is biased in its conducting region thereby providing a low level signal at an output terminal 90 which is connected to the collector electrode 89 of the transistor 86. To un-enable the AND gate 34, it is necessary to simultaneously maintain the input diodes DH1, DH2, DV1, and DV2, in a conductive state thereby drawing enough current across the resistor 81 such that its voltage drop back biases the series diodes 83 and 84 placing the base electrode 85 of the transistor 86 at ground potential thereby biasing this transistor in its non-conducting region. This provides a change in signal level at the output terminal 90 from the normally low level value to a higher level.

Referring momentarily to the diagram of FIGURE 2, it is appropriate at this point to note that when the AND gate 34 is enabled, the output signal therefrom is passed by the OR gate 43 to the input of the limiting amplifier 46 which has an output coupled directly to the control electrode 16 of the CRT 13. Depending on the position of the movable arm 45, the masking signal applied to the input of the amplifier 46 from the AND gate 34 acts to either permit the previously blocked beam to pass through the control electrode 16 or to block passage of the beam which was initially impacting the fluorescent screen 18. For example, if the movable arm 45 is in position to bypass the inverter 47, the presence of a masking signal at the input of the amplifier 46 results in a signal to the control electrode 16 to permit the beam to impact the screen 18. In the absence of masking signals, the beam is blocked. By moving the arm 45 to the terminal 48 thereby inverting the masking signal at the input to the amplifier 46, the beam, in the absence of a masking signal at the input to the amplifier 46, will be unblocked until masking signals are received, at which time the beam will be blocked.

It has been seen that when the input transistor 55 of the H2 amplifier 39 is non-conductive, the input diode DH2 is normally non-conductive. With the initiation of the horizontal deflection ramp waveform at the base electrode 54 of the input transistor 55, this transistor will begin to conduct thereby making more positive the potential at the terminal 58 connected directly to the emitter electrode 60 of the transistor 61. This gradually rising positive potential will, at some point in time, make the emitter electrode 60 of this transistor 61 more positive than its base electrode 65 thereby rendering this transistor non-conducting. This point in time will correspond to some amplitude of the horizontal deflection ramp waveform and this amplitude will be proportional to that potential value manually selected by the position of the movable arm H2 in the mask control circuit 30. In this manner, any position along the ramp waveform can be selected at which the transistor 61 will become non-conducting.

It is readily seen that this identical period of nonconductance of the transistor 61 will occur for every horizontal ramp waveform which is received at the input of the horizontal channel of the masking control circuit as long as the position of movable arm H2 remains at the same point on potentiometer 69.

Continuing with the description of the circuit of the H2 amplifier 39, it is seen that, upon the cessation of conduction of the transistor 61, the Zener diode 73 has applied to its cathode the positive bias potential applied to the collector electrode 62 of the transistor 61 through the resistor 63 from the terminal 64. This potential is sufficient to cause breakdown in the Zener diode 73 thereby creating a voltage drop across the resistors 74 and 75. The values of these resistors are such as to provide a bias voltage at the base electrode 76 of the output transistor 77 to render this transistor conducting. The value of the resistor 78 in the collector circuit of the output transistor 77 is such as to provide, in the presence of suitable current flow through the output transistor 77, a potential sufficient to render the input diode DH2 of the AND gate 34 conductive. Therefore, the input diode DH2, which was normally non-conducting, will be rendered conducting when the ramp input waveform rises to a certain level. As is evident from the earlier discussion of the AND gate 34, when the input diode DH2 is back biased, that respective input to the AND gate 34 is enabled.

As would be expected, upon the termination of the deflection ramp waveform the circuit of the H2 amplifier 39 returns to its initial state of operation where input transistor 55 is biased in its non-conducting region and the transistor 61 is conducting.

Still referring to the circuit of FIGURE 4, reference is now made specifically to the inverter 40 which connects the output of the H1 amplifier 38 to the input diode DH1 of the AND gate 34. Although the inverter circuitry is conventional in itself, specific reference is made to this stage in order to explain why the input diode DH1 is normally conducting. The bias resistor 101 in the inverter stage connects a suitable source of positive potential applied at a terminal 102 to the cathode of the input diode DH1 which, in view of the bias supply in the AND gate 34 applied to the anode of the diode DH1, renders this diode non-conducting. However, it will also be readily seen that, upon the conduction of the transistor 103 in this inverter 40, the normally high voltage applied to the cathode of the input diode DH1 will be reduced to substantially ground potential thereby forward biasing this diode and unenabling its respective input to the AND gate 34. Transistor 103 in the inverter 40 will be rendered conducting only when the series diodes 104 and 105 forward biased. This condition will ensue, in turn, only when the diode 106 also in the inverter stage 40 is back biased thereby placing a suitable forward biasing positive potential on the anodes of the series diodes 104 and 105. As was seen in the description of the operation of the H2 amplifier above, when the transistor 61 is conducting, a positive potential is available at the collector 79 of the output transistor 77. This same potential is available at the output transistor of the H1 amplifier 38 and back biases the diode 106 in the inverter 40 thereby rendering the series diodes 104 and 105 forward biased. Therefore, it is seen that the design of the inverter 40 is such that during the conduction of the transistor 61 in the H1 amplifier 38 the input diode DH1 of the AND gate 34 is normally conducting.

Referring again to the horizontal section of the mask control rircuit 30, it was seen previously that the knob H2 controls the position of the movable arm designated also by H2 along the potentiometer 69. Potentiometer 69 has one end connected through a resistor 110 to a suitable source of positive potential applied at a terminal 111. The other end of the potentiometer 69 is connected directly to the emitter electrode 112 of the transistor 113 which is in the H1 section of the mask control circuit 30. Potentiometer 69 has connected in parallel with it a Zener diode 114 which maintains a constant potential thereacross. Emitter electrode 112 of this transistor 113 is connected through a bias resistor 115 to a suitable supply of negative potential applied at a terminal 72. The direct connection of one end of the potentiometer 69 to the emitter electrode 112 provides an inter-relationship between the potential manually selected by the knob H2 and the potential manually selected by the knob H1. This is further seen in detail in the reference to FIGURE 3 hereinafter. Transistor 113 has a base electrode 116 connected through a diode 117 to a movable arm designated at H1 which corresponds to the knob H1 of the mask control circuit 30 as described with relation to FIGURE 1. Movable arm H1 is selectively positioned along a potentiometer 118 to select a potential which controls the degree of conduction of the transistor 113 thereby providing an output at the emitter electrode 112 which is directly connected to the H1 amplifier 38 and, more particularly, to the base electrode of the transistor which performs a similar function as the transistor 61 in the H2 amplifier 39. In this manner the movable arms H1 and H2 can select related potentials which are supplied to the base electrode 65 of the transistor 61 both in the H2 amplifier 39 as well as the H1 amplifier 38.

As is understood from the previous discussion of the H2 amplifier 39, the voltage level output from the mask control circuit 30 to the base electrode 65 of the transistor 61 determines a point relative to the substantially linearly increasing voltage amplitude of the input ramp waveform at which this transistor 61 ceases conduction. In the H1 amplifier 38, when this point is reached, the diode 106 in the inverter 40 is forward biased thereby rendering the transistor 103 non-conductive. The output from this transistor 103 in its non-conducting state is of such a level as to render the normally conducting input diode DH1 non-conducting, thereby enabling this input of the AND gate 34.

The operation of the vertical channel is substantially identical to the operation of the horizontal channel as hereinabove described. FIGURE 4 shows the input diodes DV2 and DV1 which correspond respectively to the V2 amplifier 42 and the V1 amplifier 49 shown in FIGURE 2. It is understood that the inverter 41 in the vertical channel is substantially identical in design as the inverter 40 in the horizontal channel. Therefore, in the initial state of operation, the input diode DV2 is normally non-conducting and the input diode DV1 is normally conducting as is the case with the input diodes DH2 and DH1 hereinabove described in detail.

Having detailed the operation of both the vertical and horizontal channels of the mask control circuit 30 and the masking circuit 27, reference will now be made to FIGURE 3 which more graphically illustrates the operation of the selectively blanked flying spot scanner system. In FIGURE 3, the document 2 is shown containing alphanumeric information, generally designated by the reference numeral 11, and graphic material, generally designated by the reference numeral 12. Along the upper horizontal edge of the document 2 is aligned the illustration of a ramp waveform 120 which is substantially similar to the shape of the deflection waveform applied to the CRT 13. Along the left vertical edge of the document 2 is aligned the illustration of another ramp waveform 120 which corresponds generally in shape to the vertical deflection waveform applied to the CRT 13. It will be noted that the time base of these waveforms in no way are accurate relative to each other because of the gross difference in frequency between the horizontal and the vertical deflection signals but are offered only for purposes of illustration. It is understood that during one raster many horizontal waveforms are received by masking circuit 27 for every vertical waveform received.

On the ramp portion 121 of the horizontal deflection waveform 120 two points have been designated H1 and H2. These two points represent two values of deflection voltage amplitude of horizontal waveform 120 and are proportional to those voltages selected by movement of the movable arms H1 and H2 in the mask control circuit 30 mentioned above in connection with FIGURE 4. Similarly, vertical waveform 122 has along its ramp portion 123 two points designated V1 and V2 which are also related to two voltage amplitudes of this waveform which occur at different times and which are proportional to those values selected in the vertical section of the mask control circuit 30 by manipulation of the knobs V1 and V2.

Recalling the normal states of the four input diodes DH1, DH2, DV1, and DV2, reference is made to line 124 extending from a point corresponding to H1 to the expiration of the ramp portion 121 of the waveform 120 and line 125 extending from the initiation of the waveform 120 to a point corresponding to point H2. These two lines represent the times relative to the time duration of each horizontal deflection waveform applied to masking circuit 27 that the input diodes DH1 and DH2, respectively, are back biased, that is, the inputs to the AND gate 34 corresponding to these input diodes are enabled. It will be noticed that, for a time period during which the horizontal deflection waveform increases from an amplitude at point H1 to an amplitude at point H2, the respective input diodes DH1 and DH2 are non-conducting.

Turning now to the vertical waveform 122, two lines 126 and 127, very similar to lines 124 and 125 in connection with waveform 120, are shown extending respectively from point V1 to the end of the ramp portion 123 of the vertical deflection waveform 122 and from the initiation of the vertical deflection waveform 122 to a point V2. These lines represent the time period in connection with the time duration of the vertical waveform 122 that the respective input diodes DV1 and DV2 in the AND gate 34 are back biased. As was seen in connection with the horizontal waveform 120, the vertical input diodes DV1 and DV2 are non-conductive coincidentally during that portion of the vertical waveform 122 between the deflection amplitudes corresponding to the points V1 and V2.

It must be remembered in connection with the horizontal waveform 120 that the time duration of this waveform from its initiation to its termination corresponds with that time duration required to deflect a beam of electrons and consequently a spot of light between the left and right edges of a document 2. Therefore, a point on the ramp portion 121 of waveform 120 corresponds proportionally to a point on the document 2, a specified distance from, for example, the left edge thereof. So when it is stated that the horizontal input diodes DH1 and DH2 of the AND gate 34 are non-conductive during a period between the deflection amplitudes at points H1 and H2 on the horizontal waveform 120, it is meant that, when the electron beam reaches a point on the fluorescent screen 18 of the CRT 13 corresponding to a deflection of an amplitude related to the deflection amplitude at the point H1 on the waveform 120, the horizontal input diodes DH1 and DH2 will both be non-conducting until the beam, corresponding to a deflection of an amplitude related to the deflection amplitude at the point H2 on the waveform 120, reaches a point on the screen at which time the input diode DH2 is forward biased. However, since there is a vertical deflection force influencing the electron beam in the CRT 13 as the horizontal deflection forces deflect the beam from one side of the screen 18 to the other, the beam will be deflected in a raster configuration formed by closely spaced substantially horizontal traces. This means that, during the period of time between the deflection amplitudes of the vertical waveform 122 corresponding to the points V1 and V2, there will be a specific number of horizontal deflection ramp waveforms which are received by the horizontal channel of the masking control circuit 27. As each one of these horizontal ramp waveforms rises to an amplitude corresponding to the point H1, the horizontal input diodes DH1 and DH2 will both be non-conducting and remain non-conducting until the horizontal ramp waveforms rise to an amplitude corresponding to the point H2 at which point both diodes will not be non-conducting simultaneously. Therefore, amplitudes corresponding to the points H1 and H2 are successively reached by the horizontal waveforms each time a trace is made horizontally across the fluorescent screen 18 of the CRT 13.

During this time period between deflection amplitudes corresponding to the points H1 and H2 on horizontal waveform 120 and in absence of the effects of the vertical channel of the masking control circuit 27, only two inputs of the AND gate 34 are enabled, viz., those inputs corresponding to the input diodes DH1 and DH2. However, as was seen previously, the effects on the condition of the AND gate 34 of the vertical channel of the masking control circuit 27 are such as to enable the respective inputs of this gate during a period of time corresponding to the rise in the vertical deflection amplitude from the amplitude corresponding to the point V1 to the amplitude corresponding to the point V2 on the waveform 122.

Therefore, when the time period of amplitude rise between the points H1 and H2 on the horizontal waveform 120 runs coincidentally with the time period of amplitude rise between the points V1 and V2 on the vertical waveform 120, all four inputs to the AND gate 34 are enabled, i.e., the input diodes DH1, DH2, DV1, and DV2 are back biased. As was noted in connection with the block diagram of FIGURE 2, when the AND gate 34 is enabled and the movable arm 45 completes the path between the amplifier 46 and the conductor 44, the electron beam in the CRT 13 will pass through the control electrode 16 or is unblanked, thereby producing a light output at the screen 18 which is of such a magnitude to effectively mask a portion of the document 2.

The coincidence of non-conducting periods of the input diodes DH1, DH2, DV1, and DV2 of the AND gate 34 is seen graphically in FIGURE 3 to be coextensive with the time the electron beam is being deflected over an area of the screen 18, the light from which may be focused in superimposition over the image of a graphic portion 12 of the document 2, thereby forming a composite image including only the image of alphanumeric portion 11 which is recordable by the camera 3.

As previously noted, the connection of one end of the potentiometer 69 in the H2 section of the mask control circuit 30, as seen in FIGURE 4, directly to the emitter 112 of the transistor 113 of the H1 section provides an inter-relationship between the selected potentials at the arms H1 and H2, and, in effect, between the points H1 and H2 on the input ramp waveform to the masking circuit 27. Since the ramp portion of this waveform is substantially linear and the voltage across the potentiometer 69 is constant, movement of the knob H1 to move the point H1 on the input ramp waveform from one amplitude to an amplitude two volts, for example, less results in a corresponding movement of the point H2 from one amplitude to another amplitude two volts below the first amplitude. This change in the point H2 is effected without actual movement of the arm H2 along the potentiometer 69. This also is true for the relationship between the points V1 and V2. In this manner, it is seen from FIGURE 3 that by manipulating the knobs H1 and V1 the position of the light pattern from the CRT 13 can be positioned anywhere on the document 2 without changing its size. This feature adds speed and flexibility to the system where successive documents to be recorded have graphic portion, for example, of equal size but different locations.

Figure 5:
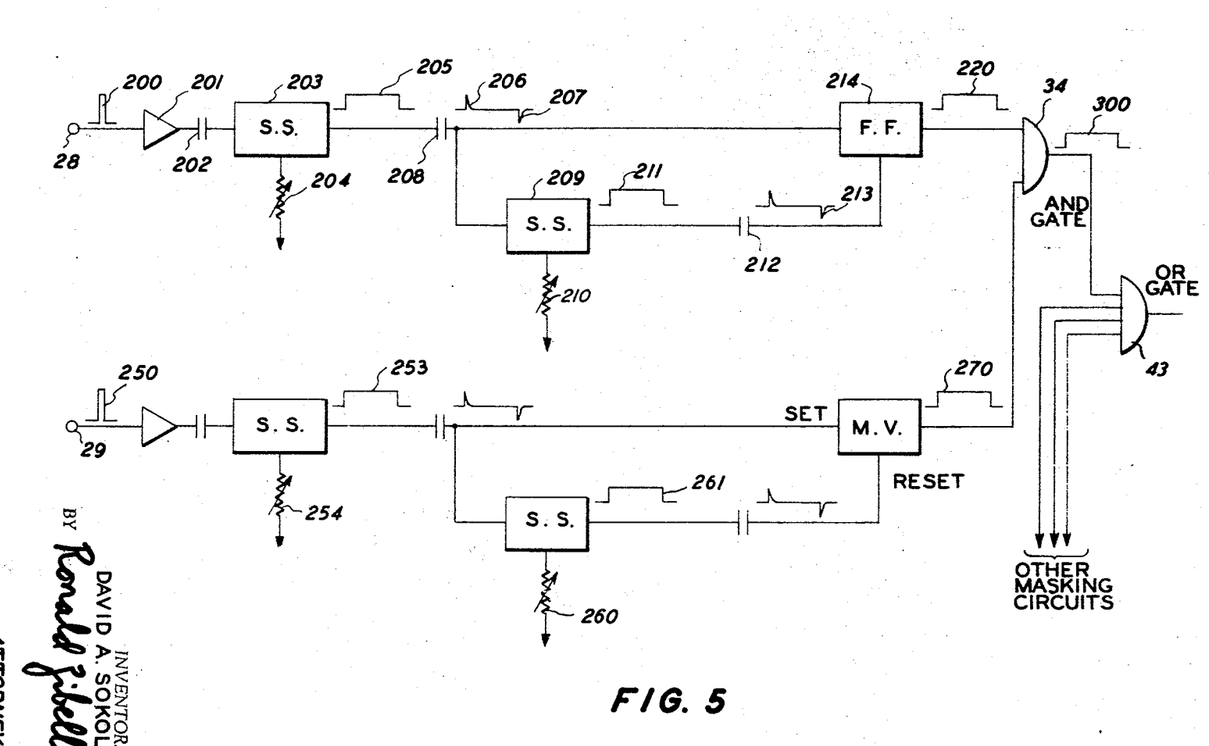
FIGURE 5 is a block diagram of another embodiment of the cathode ray tube control circuitry.

The CRT light pattern can also be generated by the circuit shown in FIGURE 5 and, like the circuitry of FIGURE 4, is able to position the light mask on the document without changing its size or shape. The circuit in FIGURE 5 utilizes horizontal and vertical sync pulses produced by CRT control circuit 20 rather than the deflection ramp signals to generate and position the light mask, and, except for this difference, may be substituted into the block diagram of FIGURE 1 as masking circuit 27. The masking circuit input lines 28 and 29 (FIGURE 1) carry CRT sync pulses rather than deflection ramp signals in this case. Manual control knobs H1, H2, V1 and V2 as well as reversal switch 31 of mask control circuit 30 are used with the circuit of FIGURE 5 but the specific circuitry of mask control circuit 30 shown in FIGURE 4 is not necessary because of its particular application to the masking circuit of FIGURE 4. Where appropriate, items common to the various figures are identified with the same reference number.

The CRT control circuit sync pulses are timing signals developed by control circuit 20 and used to generate the deflection ramp signals. For each horizontal and vertical sync pulse produced by the control circuit, horizontal and vertical deflection ramp signals are generated and in turn used to create the scanning raster when applied to the CRT deflection yokes. The respective sync pulses, or timing signals, are used by the circuit of FIGURE 5 to correlate the generation of mask-forming blanking pulses with the movement of the electron beam.

The circuit of FIGURE 5 replaces that part of the circuit of FIGURE 2 between the input conductors 28 and 29 and AND gate 34. The circuit of FIGURE 5, like the circuit it replaces, supplies the necessary inputs to AND gate 34 that enable the AND gate to pass at the proper instant in time a blanking or "unblanking" signal—depending on the position of polarity reversal switch 31—to amplifier 46 and CRT control electrode 16. Blanking pulse 300 (FIGURE 5) at the output of AND gate 34 is the signal used to generate the light mask. The circuits used to produce horizontal and vertical blanking pulses 220 and 270 are substantially identical therefore only the horizontal blanking circuit is explained in detail.

Referring now to FIGURE 5, the horizontal sync pulse 200 is applied to the masking circuit via conductor 28. Pulse 200 is applied to amplifier 201 for impedance matching and pulse shaping purposes well known and understood by those skilled in the art. Simultaneously with the application of sync pulse 200 to the masking circuit, the same pulse, or one in synchronization with it, is applied to a ramp generator in CRT control circuit 20 (FIGURE 1) to produce the horizontal deflection signal. Capacitor 202 differentiates the sync pulse producing positive and negative spikes respectively from the leading and trailing edges of the sync pulse. The negative spike triggers single shot multivibrator 203 thereby generating the leading edge of pulse 205. The duration of pulse 205 is controlled by the setting of potentiometer 204. (Potentiometer 204 corresponds to control knob H1 shown in FIGURE 1). The manner in which the potentiometer affects the duration of pulse 205 will be explained in detail in connection with FIGURE 6. Capacitor 208 differentiates pulse 205 thereby generating positive spike 206 on the leading edge of pulse 205 and negative spike 207 on the trailing edge. Spike 207 is applied along parallel paths to the set terminal of flip-flop 214 and to the input terminal of single shot multivibrator 209. The application of the negative spike to the flip-flop results in the generation of the leading edge of horizontal blanking pulse 220. At this point it should be noted that the setting of potentiometer 204 (control knob H1) determines the instant in time during the horizontal sweep of the electron beam at which a blanking pulse is initiated. Potentiometer 204 controls the duration of pulse 205, causing variations ranging from zero to the length of the horizontal sweep, and therefore controls the instant at which negative spike 207, which triggers the flip-flop, is generated.

Single shot multivibrator 209 is triggered by spike 207, simultaneously with the triggering of flip-flop 214, resulting in the generation of pulse 211. Potentiometer 210, which corresponds to the control knob H2 in FIGURE 1, controls the duration of pulse 211. The operation of potentiometer 210 is similar to that of potentiometer 204 and is also explained in connection with the discussion of the circuit in FIGURE 6. Pulse 211 is differentiated by capacitor 212 and negative spike 213, generated by differentiating the trailing edge of pulse 211, is applied to the reset terminal of flip-flop 214 to produce the trailing edge of horizontal blanking pulse 229. Potentiometer 210 (control knob H2 in FIGURE 1) therefore controls the point in time following the generation of the leading edge of the horizontal blanking pulse at which the trailing edge of the blanking pulse is generated since the potentiometer determines the duration of pulse 210 and thus the time at which spike 213 is applied to the reset terminal of the flip-flop.

The vertical blanking pulse 270 is generated from the vertical sync pulse 250 in a similar fashion. Potentiometer 254 (control knob VII in FIGURE 1) controls the duration of pulse 255 and thus the point in time at which the lead edge of the vertical blanking signal is generated and potentiometer 260 (control knob V2 in FIGURE 1) controls the duration of pulse 261 and thus the point in time at which the trailing edge of pulse 270 is generated. The horizontal and vertical blanking pulses are applied to AND gate 34 to generate blanking pulse 300 applied to the CRT through amplifier 46. Additional masking circuits of the type shown in FIGURE 5 may be coupled to OR gate 43 to permit the simultaneous formation of several light masks.

Figure 6:
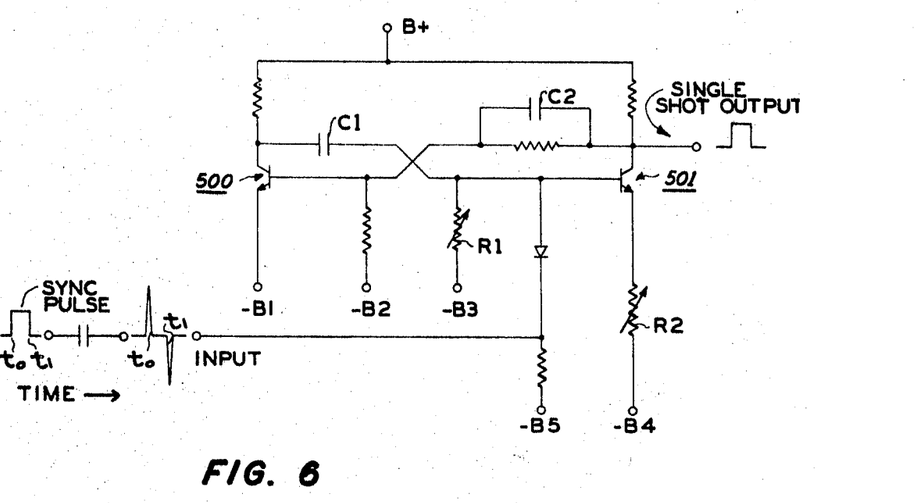
FIGURE 6 is a schematic circuit of a single shot multi-vibrator used in the block diagram of FIGURE 5.

The manner in which potentiometers 204, 210, 254 and 260 vary the duration of the pulses produced by the single shot multivibrators is best understood by referring to the single shot multivibrator shown in FIGURE 6.

The output of the multivibrator is taken from the collector of transistor 501 which is normally conducting thereby maintaining the collector at some potential level below B+. A negative spike signal applied to the base electrode of transistor 501 cuts off the transistor raising the potential at the collector (the output) toward B+. This transition is potential level is coupled to the base electrode of transistor 500 through capacitor C2 triggering this normally non-conducting transistor to a conducting state. Turning on transistor 500 causes a voltage drop at its collector electrode which in turn is applied through capacitor C1 to the base electrode of transistor 501 to hold that transistor in a non-conducting state. The duration of the output pulse is determined by the time constant of capacitor C1 and resistor R1. The time constant determines the period of time necessary for a charging ramp developed across capacitor C1 to reach a potential level to cause transistor 501 to revert back to its normally conducting state.

The duration of the single shot output pulse can be varied by changing the multivibrator time constant, i.e., by varying the value of either capacitor C1 or resistor R1. The duration of the output pulse can also be varied by changing the biasing network of transistor 501 so as to alter the potential level to which capacitor C1 must be charged to cause transistor 501 to conduct. In the first case, variations in R1 and/or C1 cause a change in the slope of the charging ramp developed across capacitor C1 whereby varying the time required to reach the voltage level necessary to trigger transistor 501 to a conducting state. In the second case the slope of the charging ramp developed across capacitor C1 is not changed but the amplitude the ramp is required to reach before triggering transistor 501 is changed.

The potentiometers shown in FIGURE 5 may be inserted into the multivibrator of FIGURE 6 as either resistor R1 or R2. Variation to resistor R1 causes a change in the multivibrator time constant while variations to resistor R2 cause a change in transistor 501 trigger level.

Figure 7:
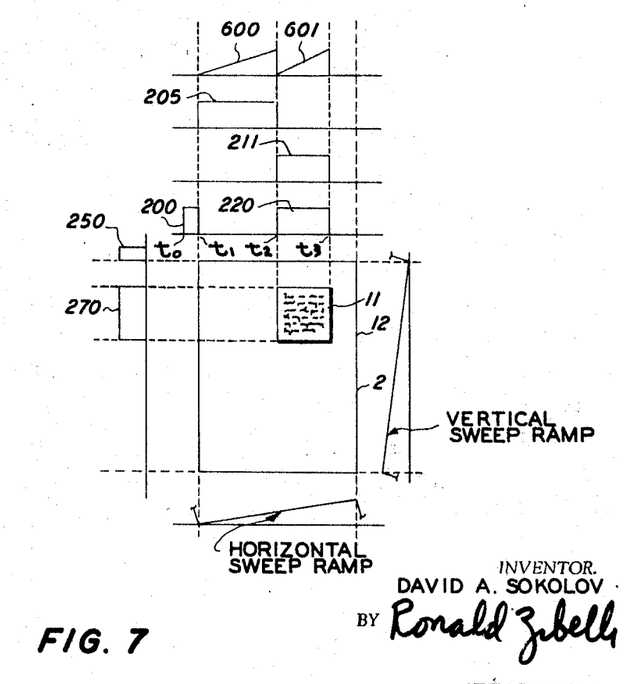
FIGURE 7 illustrates the relation between the signals of the circuit of FIGURE 5 and a document.

Referring now to FIGURE 7, document 2 containing alphanumeric and graphic information 11 and 12 is compared with the signals generated by the masking circuit of FIGURE 5. The signals are not drawn to scale and should not be used to compare horizontal and vertical signals since the horizontal blanking pulse 229 is many times shorter in duration than the vertical blanking pulse 239. All the vertical blanking circuit signals are not shown because they are similar to those of the horizontal blanking circuit.

The identification numbers associated with the signals in FIGURE 7 correspond to those given in FIGURE 5. Horizontal sync pulse 200 triggers single shot multivibrator 203 initiating the generation of pulse 205. The trailing edge of pulse 205 initiates simultaneously the generation of the leading edges of pulse 209 and blanking pulse 220. Since the duration of pulse 205 is variable, the leading edge of blanking pulse 220 is also variable and may be positioned at any point along the width of document 2. Ramp 600 represents the charging ramp signal of multivibrator 203 which triggers single shot 203 back to its original state when a particular voltage level is reached. Likewise ramp 601 represents the charging ramp of multivibrator 209 which produces pulse 211. Pulse duration, as discussed earlier, is varied either by changing the slope of ramps 600 and 601 or by changing the voltage level which causes the multivibrators to return to a normal state.

Single shot multivibrators other than the collector coupled type shown in FIGURE 6 may be employed in the circuit of FIGURE 5 and various resistors, capacitors or even bias supply sources could be varied to change the slope of a multivibrator charging ramp or the trigger level of a multivibrator and such modifications are intended to be included within the scope of the appended claims. In addition, pulse generating circuits other than single shot and flip-flop multivibrators may be used in the circuit of FIGURE 5 since the multivibrators are used to perform switching operations.

Figure 8:
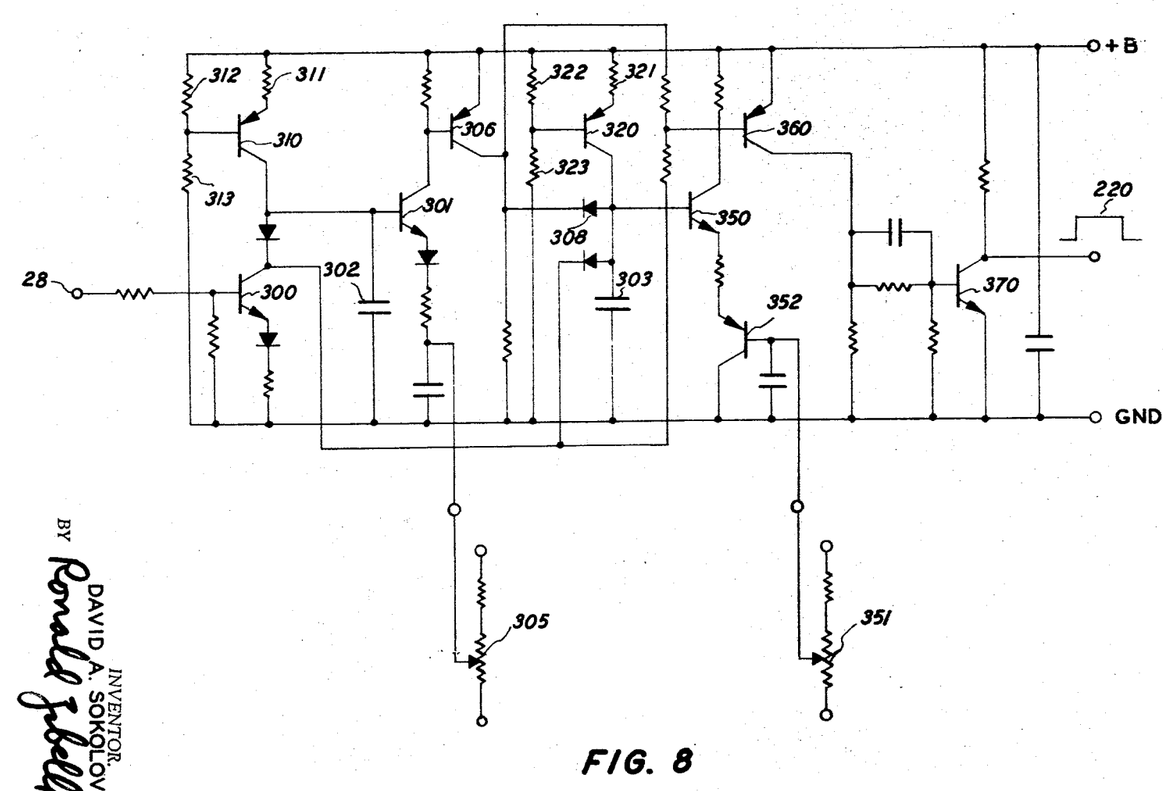
FIGURE 8 is a circuit of still another embodiment of the cathode ray tube control circuitry.
Figure 9:
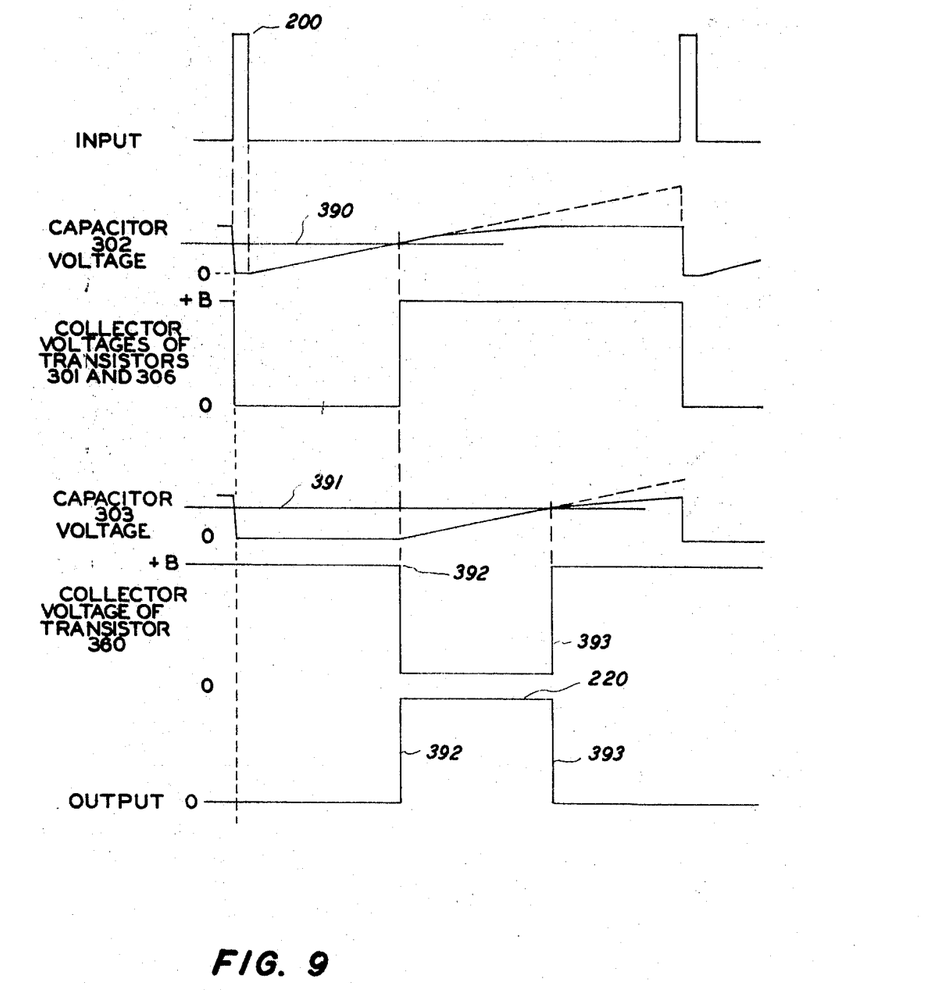
FIGURE 9 shows the waveforms of the signals generated by the circuit in FIGURE 8.

The circuit in FIGURE 8 generates the variable width blanking pulses 220 and 270 in a similar manner to the circuit in FIGURE 5 but without using multivibrators. The waveform of the signals produced by the masking circuit of FIGURE 8 are shown in FIGURE 9. Where appropriate, the identification numbers used in FIGURES 8 and 9 are the same as those in FIGURE 5. The following discussion is limited to the generation of the horizontal blanking pulse 220 since substantially the same circuit is used in producing the vertical blanking pulse 270.

The circuit of FIGURE 8 generates a variable width blanking pulse in variable time relation to the synchronization pulse as does the circuit in FIGURE 5. Capacitors 302 and 303 are charged linearly by constant current sources to produce ramp signals used to initiate the generation of the leading and trailing edges of the blanking pulses. A ramp voltage signal is developed at capacitor 302 by the constant current source comprising transistor 310 and resistors 311, 312 and 313. A ramp voltage is developed at capacitor 303 by the constant current source comprising transistor 320 and resistors 321, 322 and 323. The leading edge of the blanking pulse is generated when the ramp signal developed at capacitor 302 reaches a predetermined potential level selected by potentiometer 305. The adjustment of potentiometer 305 corresponds to the adjustment of knob H1 in FIGURE 1. The trailing edge of the blanking pulse is generated when the voltage on capacitor 303 reaches a predetermined voltage level as determined by the potentiometer 351. Potentiometer 351 corresponds to the control knob H2 in FIGURE 1.

Synchronization pulses 200 are received at terminal 28 to trigger normally non-conducting transistor 300 to an ON state. Transistor 300 provides a discharge path to ground for capacitor 302 and 303 when it is ON. With transistor 300 in its normally OFF state the transistor 310 constant current source charges capacitor 302 at a linear rate. Capacitor 302 is coupled to the base electrode of transistor 301, a switch. The potentiometer 305 is coupled through a resistor to the emitter electrode of transistor 301. When the voltage at the base electrode reaches a predetermined level, (e.g. line 390 in FIGURE 9, controlled by potentiometer 305) transistor 301, which is normally non-conducting, is triggered to an ON state. Blanking pulse 220 is generated at the collector electrode of normally conducting transistor 360 (inverted). When transistor 301 is turned ON, transistor 306 is in turn rendered conducting and the collector electrode of transistor 306 assumes a potential of +B. The +B potential at the collector electrode of transistor 306 is applied to the base electrode of transistor 360 turning that normally conducting transistor OFF thereby generating the leading edge of the blanking pulse. When transistor 360 is turned OFF its collector electrode falls from a +B potential to near zero potential. The output of transistor 360 is inverted and amplified by transistor 370 with blanking pulse 220 being generated at the collector electrode of transistor 370.

Prior to the generation of the leading edge of the blanking pulse at transistors 360 and 370 capacitor 303 was held to near ground potential through diode 308. Charge on capacitor 303 is initially discharged through diode 307 and transistor 300 when transistor 300 is triggered by synchronization pulse 200. The capacitor 303 remains at the zero potential as long as transistors 301 and 306 are non-conducting. Diode 308 provides a path to ground for the transistor 320 constant current source thereby preveting charging of capacitor 303. Transistor 306 is turned ON when the leading edge of the blanking pulse is generated. With transistor 306 ON, its collector assumes a potential of +B, thereby back-biasing diode 308 and permitting capacitor 303 to be charged by the transistor 320 constant current source.

Capacitor 303 is coupled to the base electrode of transistor 350, a switch, and potentiometer 351 is coupled to the emitter electrode of transistor 350 through capacitor 351. When the linearly increasing voltage on capacitor 303 reaches a predetermined voltage level, (e.g. line 391 in FIGURE 9, controlled by potentiometer 351), transistor 350 is turned ON. With transistor 350 ON, its collector electrode falls from a +B potential to a potential near ground. This lower potential is sufficient to render transistor 360 conducting, thereby causing the generation of the trailing edge of blanking pulse 220.

The time, relative to the synchronization pulse, at which the leading edge of the blanking pulse (edge 392 in FIGURE 9) is generated is controlled by potentiometer 305. The duration of the blanking pulse is controlled by potentiometer 351 which determines the time at which the trailing edge (edge 393 in FIGURE 9) is generated. The potentiometers control the voltage levels required to trigger transistors 301 and 350 thereby controlling the generation of the blanking pulse.

It would be apparent to one skilled in the art that the polarity of the foregoing signals and the polarity to which the flip-flop and multivibrators are sensitive can be reversed without changing the function of the described circuitry. For this reason the polarities shown are not intended to be limitations on the present circuitry but are given to simplify the explanation of the circuit operation.

In summary, the present invention relates to a novel recording system in which an operator can view the document to be recorded and at the same time control a flying spot scanner arrangement in such a manner as to effect overexposure of the recording medium at those areas on which portions of the document to be recorded are focused thereby masking these portions or making them impossible to be recorded on the recording medium. The control of the operator over a flying spot scanner arrangement relates specifically to the application of suitable masking signals to a control electrode of the cathode ray tube in the scanner system. These masking signals are generated in accordance with the positions of various mask control knobs available for manipulation by the operator. After the initial unmasked portions of the document are recorded, at the discretion of the operator the previously unmasked portions can then be masked by activation of a switch providing the previously masked portions for recording.

While the invention has been described with reference to a specific system herein, it is not confined to the details set forth, since it is apparent that other arrangements of the components may be made without departing from the scope of the invention. Thus, for example, although the arrangement in FIGURE 1 utilizes a beam splitter element, it is readily understood that the Vidicon camera 7 may be positioned relative to the support member 1 so as to pick up directly the image of the document 2 while the light from the cathode ray tube 13 may be superimposed by the lens 19 directly on desired portions of the document to be masked. It should also be understood that the closed circuit television system illustrated in this figure facilitates the operation of the system but the support member 1 could be positioned relative to the operator so that he could directly or through a mirror arrangement see the illuminated side of the document 2 as the light from the CRT 13 is focused thereon or view the composite image at the beam splitter.

Although a simple support member is illustrated in FIGURE 1, it is recognized that a mechanical conveyor system could be used to move a series of documents into recording position relative to camera 3 and held there momentarily during an exposure step. Flash lamps 4 could be further utilized to "freeze" any motion of the document at the time of exposure.

In addition, a transparent support member could be adapted for use with the inventive concept with the flying spot scanner on the opposite side of the support member from camera 3 depending, of course, on the relative transparency of the document to be recorded.

The particular circuits illustrated in FIGURE 4 may be replaced with suitable alternative circuits which accomplish the same result as those illustrated without departing from the scope of this invention. For example, the mask control 30, specifically, the potentiometers 118 and 69 and their respective movable arms H1 and H2 could be replaced by a single potentiometer having two arms movable relative to each other as well as to the potentiometer resistance.

Another circuit modification contemplated by this disclosure is the provision of separate deflection waveform generators in the masking circuit 27 which could be suitably synchronized with the waveforms supplied to yoke 17 of CRT 13.

Although specific reference is made to a flying spot scanner as a selectively controlled light source, a mechanical shutter trrangement could also be used with this novel masking concept without departing from the scope of the appended claims.

Therefore, it is the applicant's intention to cover such modifications or changes as may come within the purposes of the invention as defined by the following claims.

What is claimed is:
1. A recording apparatus comprising:
 (a) recorder means having a light sensitive recording medium of a predetermined recording sensitivity;
 (b) support means for supporting a document, a portion of which is to be recorded on said recording medium;
 (c) first optical means position relative to said recorder means and said support means to focus an image of a supported document on said recording medium;
 (d) means for selectively generating at least one light pattern of variable size and having a substantially uniform inensity exceeding said recording sensitivity; and
 (e) second optical means positioned relative to said first optical means and said support means to superimpose said pattern of light over a selected area of said document image.

2. A recording apparatus according to claim 1 including means for directing illumination onto a document on said support means having an intensity within said recording sensitivity.

3. A recording apparatus according to claim 1 wherein:
 (a) said light pattern generating means includes a selectively controllable flying spot scanner system and lens means to focus the light produced by said system; and
 (b) said second optical means includes a beam splitter element positioned relative to said lens means and said support means so as to direct a refracted image of a supported document and a reflected image of said one light pattern toward said first optical means.

4. A recording apparatus comprising:
 (a) support means for supporting a document, a portion of which is to be recorded;
 (b) means for selectively generating at least one pattern of light of a predetermined substantially uniform intensity;
 (c) optical means positioned relative to said support means and said light pattern generating means to form a composite image of both the image of the document to be recorded and the image of said light pattern; and,
 (d) recorder means having a light sensitive recording medium of recording sensitivity which is exceeded by the intensity of said light pattern image for recording those portions of the composite image unexposed to said selectively generated light pattern.

5. A recording apparatus comprising:
 (a) a recorder means having a light sensitive recording medium of a predetermined recording sensitivity;
 (b) suport means for supporting a document, a portion of which is to be recorded;
 (c) first optical means to focus the image of a supported document to be recorded on said recording medium;
 (d) means for directing illumination having an intensity within said recording sensitivity onto a supported document to be recorded;

(e) means for selectively generating at least one light pattern of variable size and of substantially uniform intensity exceeding said recording sensitivity;

(f) second optical means positioned relative to said first optical means, said support means, and said light pattern generating means to direct toward said first optical means a first composite image of a reflected image of said pattern of light superimposed over a refracted image of the document to be recorded and to produce a second composite image of a refracted image of said light pattern superimposed over a reflected image of the document to be recorded, said recording medium being sensitive to those portions of said first composite image unexposed to said selectively generated light pattern; and, (g) viewing means to receive said second composite image.

6. Apparatus according to claim 5 wherein said light pattern generating means comprises:

(a) cathode ray tube having
 (1) fluorescent screen,
 (2) source of electrons,
 (3) control electrode, and
 (4) focus means to form said said electrons into a beam and direct said beam toward said screen;

(b) deflection voltage generating means for generating at two output terminals horizontal and vertical deflection voltages, respectively, having substantially linearly varying amplitudes;

(c) electron deflection means coupled to said two output terminals and responsive to said deflection voltages to generate in said cathode ray tube an electron deflection force to deflect said electron beam to impact said screen in a raster-type configuration substantially coextensive with said fluorescent screen such that the horizontal and vertical coordinates of any point of impact are proportional to an amplitude of said horizontal deflection voltages and to an amplitude of said vertical deflection voltages, respectively;

(d) first, second, third and fourth terminals;

(e) first signal means for generating a first signal proportional to a first amplitude of said horizontal deflection voltages;

(f) second signal means for generating a second signal proportional to a second amplitude of said horizontal deflection voltages;

(g) third signal means for generating a third signal proportioned to a first amplitude of said vertical deflection voltages;

(h) fourth signal means for generating a fourth signal proportional to a second amplitude of said vertical deflection voltages;

(i) first means for coupling said first, second, third, and fourth signals to said first, second, third, and fourth terminals, respectively;

(j) masking circuit means coupled to said two output terminals and to said first, second, third, and fourth terminals and responsive to said deflection voltages, said first, second, third, and fourth signals to generate a series of masking signals of such polarity and magnitude as to prevent impact of said electron beam on said screen during the time said electron beam would be deflected across a selected area of said fluorescent screen defined by horizontal and vertical coordinates proportional to said first and second amplitudes of said horizontal deflection voltages and first and second amplitudes of said vertical deflection voltages, respectively; and (k) second means to couple said series of masking signals to said control electrode.

7. Apparatus according to claim 6 wherein said second coupling means additionally includes polarity reversal means to selectively reverse the polarity of said masking signals to permit said electron beam to impact said fluorescent screen only during the deflection of said electron beam across said selected area.

8. Apparatus according to claim 5 wherein said light pattern generating means comprises;

(a) cathode ray tube having
 (1) source of electrons,
 (2) control electrode,
 (3) fluorescent screen, and,
 (4) focus means to form said electrons into a beam and direct said beam toward said screen;

(b) pulse means for generating susbtantially linear horizontal and vertical ramp voltages;

(c) deflection means responsive to said ramp voltages to generate a fluctuating deflection force capable of deflecting said electron beam to form a raster on said screen;

(d) first signal means for generating a first signal corresponding to a first horizontal position on said raster;

(e) second signal means for generating a second signal corresponding to a second horizontal position on said raster;

(f) third signal means for generating a third signal corresponding to a first vertical position on said raster;

(g) fourth signal means for generating a fourth signal corresponding to a second vertical position on said raster;

(h) logic means responsive to said first, second, third, and fourth signals for generating a control signal, said control signal being of such polarity and amplitude as to block said beam from impacting said screen except during the time said electron beam would be deflected over that area of said raster defined by said first and second horizontal and vertical positions; and, (i) means to couple said control signal to said control electrode.

9. Apparatus according to claim 5 wherein said light pattern generating means comprises:

(a) cathode ray tube having
 (1) source of electrons,
 (2) control electrode,
 (3) fluorescent screen, and,
 (4) focus means to form said electrons into a beam and direct said beam toward said screen, (b) pulse means for generating substantially linear horizontal and vertical ramp voltages;

(c) deflection means responsive to said ramp voltages to generate a fluctuating deflection force capable of deflecting said electron beam to form a raster on said screen;

(d) first signal means for generating a first signal corresponding to at least a first point on said screen;

(e) second signal means for generating a second signal corresponding to at least a second point on said screen;

(f) third signal means for generating a third signal corresponding to at least a third point on said screen;

(g) fourth signal means for generating a fourth signal corresponding to at least a fourth point on said screen;

(h) logic means responsive to said first, second, third, and fourth signals for generating a control signal of such polarity and amplitude to effect passage of said beam from said cathode to that selected area of said screen enclosed by straight lines connecting successively said first, second, third, and fourth points on said screen and to effect blockage of said beam from the remaining area of said screen; and (i) means for coupling said control signal to said control electrode.

10. The system according to claim 9 wherein said coupling means includes additionally reversed means for selectively reversing the polarity of said control signal to effect blockage of said beam from said cathode to said selected area of said screen and to effect passage of said beam to said remaining area of said screen.

References Cited

UNITED STATES PATENTS

| | | | |
|---|---|---|---|
| 2,508,562 | 5/1950 | Bonner | 178—7.88 X |
| 2,961,920 | 11/1960 | Sachtleben | 178—6.7 X |
| 2,985,063 | 5/1961 | Putzrath | 178—6.7 X |
| 3,274,545 | 9/1966 | Bowles et al. | 340—24 |
| 3,297,822 | 1/1967 | Braid | 178—7.88 X |

FOREIGN PATENTS 598,491  6/1934  Germany.

ROBERT L. GRIFFIN, Primary Examiner

RICHARD K. ECKERT, JR., Assistant Examiner

U.S. Cl. X.R.

178—6, 7; 346—110; 355—46